(12) United States Patent
Kozlovsky (10) Patent No.: US 10,148,505 B2
(45) Date of Patent: Dec. 4, 2018

(54) PROVISIONING RESOURCES FOR DATACENTERS

(71) Applicant: EMC Corporation, Hopkinton, MA (US)

(72) Inventor: Vitaly Stanislavovich Kozlovsky, Saint-Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 373 days.

(21) Appl. No.: 14/410,299

(22) PCT Filed: Mar. 31, 2014

(86) PCT No.: PCT/RU2014/000229
§ 371 (c)(1),
(2) Date: Dec. 22, 2014

(87) PCT Pub. No.: WO2015/152751
PCT Pub. Date: Oct. 8, 2015

(65) Prior Publication Data
US 2016/0277233 A1    Sep. 22, 2016

(51) Int. Cl.
*G06F 15/16* (2006.01)
*H04L 12/24* (2006.01)
(Continued)

(52) U.S. Cl.
CPC .......... *H04L 41/082* (2013.01); *G06F 9/5077* (2013.01); *G06F 17/3007* (2013.01);
(Continued)

(58) Field of Classification Search
CPC ... H04L 41/082; H04L 67/1097; H04L 43/08; H04L 41/0813; H04L 43/067; H04L 67/30
(Continued)

(56) References Cited

U.S. PATENT DOCUMENTS 7,577,729 B1 *   8/2009  Umbehocker ........ G06F 3/0607
                                                709/213
8,478,845 B2 *   7/2013  Agarwala ............. G06F 9/5061
                                                709/216
(Continued)

FOREIGN PATENT DOCUMENTS

WO    2014028495 A2    2/2014

*Primary Examiner* — Moustafa M Meky
*Assistant Examiner* — Thorne E Waugh
(74) *Attorney, Agent, or Firm* — BainwoodHuang (57) ABSTRACT

Improved techniques involve creating a feedback cycle between a framework for managing many data storage arrays and system for provisioning a data storage array using real-time usage statistics from the framework. Along these lines, a multi-system provisioning tool provides an initial configuration of storage systems in a datacenter; such an initial configuration includes provisioning of logical disks for each system. As this tool monitors activity within the datacenter, it generates live runtime data for each logical disk within each system. The tool then compares this live runtime data to external runtime data received from a central database and looks for anomalies in the live runtime data. Upon detecting an anomaly in a logical disk, the tool may respond by finding logical disks in other storage arrays from which storage resources may be swapped.

20 Claims, 4 Drawing Sheets

(51) Int. Cl.
  *G06F 9/50* (2006.01)
  *G06F 17/30* (2006.01)
  *H04L 12/26* (2006.01)
  *H04L 29/08* (2006.01)

(52) U.S. Cl.
  CPC ........ *H04L 41/0813* (2013.01); *H04L 43/067* (2013.01); *H04L 43/08* (2013.01); *H04L 67/1097* (2013.01); *H04L 67/30* (2013.01)

(58) Field of Classification Search
  USPC .................................................. 709/220–230
  See application file for complete search history.

(56) References Cited

U.S. PATENT DOCUMENTS

| | | | | |
|---|---|---|---|---|
| 8,578,076 | B2* | 11/2013 | van der Linden | G06F 9/5077 710/72 |
| 8,707,070 | B2* | 4/2014 | Muller | G06F 1/3221 713/300 |
| 8,943,269 | B2* | 1/2015 | Puttaswamy Naga | G06F 12/0866 711/113 |
| 9,021,200 | B1* | 4/2015 | Kushmerick | G06F 12/02 711/114 |
| 9,043,184 | B1* | 5/2015 | Gabay | G05B 23/02 702/183 |
| 9,110,599 | B1* | 8/2015 | Fair | G06F 3/0644 |
| 9,417,891 | B2* | 8/2016 | Beveridge | G06F 9/4445 |
| 2009/0288135 | A1 | 11/2009 | Chang et al. | |
| 2011/0213886 | A1 | 9/2011 | Kelkar et al. | |
| 2012/0109619 | A1 | 5/2012 | Gmach et al. | |
| 2014/0108665 | A1* | 4/2014 | Arora | H04L 67/141 709/227 |
| 2014/0223096 | A1* | 8/2014 | Zhe Yang | G06F 12/0871 711/114 |
| 2014/0310488 | A1* | 10/2014 | Strange | G06F 3/0667 711/162 |
| 2015/0058487 | A1* | 2/2015 | Karamanolis | G06F 12/0802 709/226 |
| 2015/0058577 | A1* | 2/2015 | Earl | G06F 3/0613 711/136 |
| 2015/0058863 | A1* | 2/2015 | Karamanolis | G06F 9/5083 718/105 |

\* cited by examiner

Figure 4 ized statistics to an administrator concerning, for example, average and peak storage capacity for each data storage array. Such a management tool also provides an alerting service for notifying an administrator of a problem with any particular system.

PROVISIONING RESOURCES FOR DATACENTERS

BACKGROUND

Modern datacenters contain many data storage systems for storing and processing vast amounts of data. Each data storage system, in turn, contains an array of storage disks on which data is stored and a storage processor for processing read and write requests. Examples of such data storage systems include the VNX, VNXe, and VMAX series of storage systems, manufactured by EMC Corp. of Hopkinton, Mass.

Conventional datacenter management applications allow administrators to manage multiple data storage systems in a datacenter. Such management tools monitor activity in a datacenter and present aggregated statistics to an administrator concerning, for example, average and peak storage capacity for each data storage array. Such a management tool also provides an alerting service for notifying an administrator of a problem with any particular system.

SUMMARY

Unfortunately, the above-described conventional datacenter management applications do not provide storage provisioning capability. Nevertheless, there are conventional storage provisioning applications that provide instructions for an administrator to provision storage for a data storage array in a datacenter based on usage profiles. For example, such a provisioning application allows an administrator to allocate workloads on various logical disks provided by a storage array as needed.

On the other hand, there are further deficiencies with both the above-described conventional datacenter management applications and conventional storage provisioning applications. For example, these applications cannot provide cloud provisioning, i.e., provisioning for many data storage arrays in a data storage center. Rather, a conventional datacenter management application is able to manage multiple data storage systems, but cannot provide provisioning. On the other hand, a conventional storage provisioning application can provision storage for a single data storage system, but cannot automatically provision storage for multiple systems together in a datacenter.

In contrast to the above-described conventional applications that lack the capability to provision storage for multiple data storage systems in a datacenter, improved techniques involve creating a feedback cycle between a framework for managing many data storage arrays and system for provisioning a data storage array using real-time usage statistics from the framework. Along these lines, a multi-system provisioning tool provides an initial configuration of storage systems in a datacenter; such an initial configuration includes aggregation of the physical disks into logical units (LUNs or logical disks) and assignment of the LUNs according to workload requirements. As this tool monitors activity within the datacenter, it analyzes live runtime data generated by each storage system for each logical disk and stored in a file or accessible via specific system API. The tool then compares this live runtime data to external runtime data received from a central database and looks for anomalies in the live runtime data. Upon detecting an anomaly in an access pattern to the logical disk, the tool may respond by finding logical disks in other storage arrays from which storage resources may be swapped. At the same time, the tool may estimate the performance of a processor and overall efficiency of a particular storage system and make a decision about the necessity of such swapping.

Advantageously, the improved technique allows for transparent cloud provisioning. When the multi-system provisioning tool is able to provide configuration scripts for individual data storage systems to run via their storage processors, the datacenter may become autoconfiguring, provisioning storage from other systems in the datacenter as needed.

One embodiment of the improved technique is directed to a method of operating a datacenter having multiple data storage systems. The method includes assigning a configuration state to each of the multiple data storage systems of the datacenter, the multiple data storage systems each providing a plurality of logical disks. The method also includes generating live runtime data indicating runtime performance of the logical disks provided by each of the multiple data storage systems. The method further includes performing a comparison operation on the live runtime data and expected runtime data, the comparison operation producing a comparison result. The method further includes adjusting the configuration state of the multiple data storage systems based on the received comparison result.

Additionally, some embodiments of the improved technique are directed to an apparatus constructed and arranged to operate a datacenter having multiple data storage systems. The apparatus includes a network interface, memory, and a controller including controlling circuitry constructed and arranged to carry out a method of operating a datacenter having multiple data storage systems such as described above.

Furthermore, some embodiments of the improved technique are directed to a computer program product having a non-transitory computer readable storage medium that stores code including a set of instructions which, when executed by a computer, cause the computer to carry out a method of operating a datacenter having multiple data storage systems such as described above.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques involve creating a feedback cycle between a framework for managing many data storage arrays and system for provisioning a data storage array using real-time usage statistics from the framework. Along these lines, a multi-system provisioning tool provides an initial configuration of storage systems in a datacenter; such an initial configuration includes provisioning of logical disks for each system. As this tool monitors activity within the datacenter, it generates live runtime data for each logical disk within each system. The tool then compares this live runtime data to external runtime data received from a central database and looks for anomalies in the live runtime data. Upon detecting an anomaly in an access pattern to the logical disk, the tool may respond by finding logical disks in other storage arrays from which storage resources may be swapped. At the same time, the tool may estimate the performance of a processor and overall efficiency of a particular storage system and make a decision about the necessity of such swapping.

Figure 1:
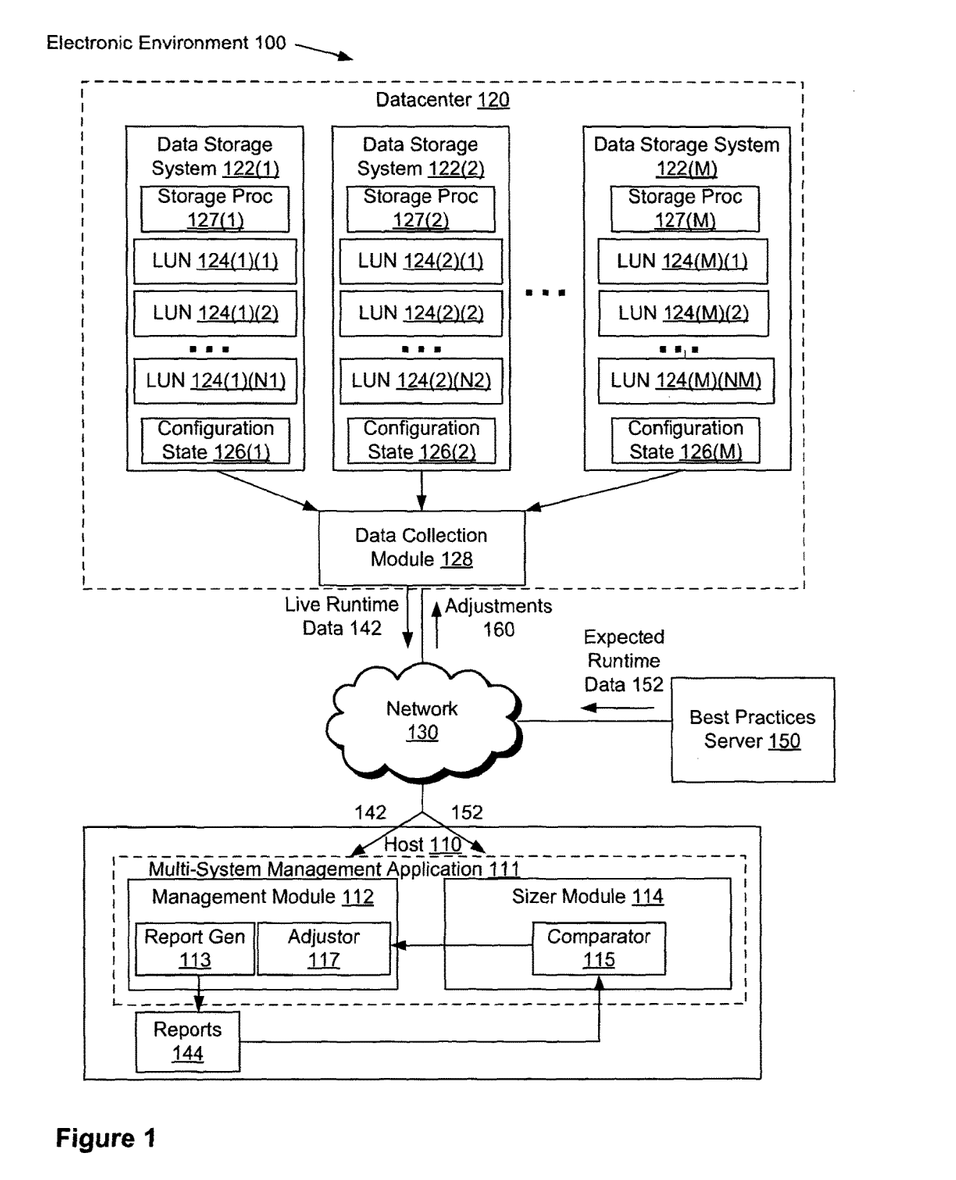
FIG. 1 is a block diagram illustrating an example electronic environment in which the improved technique may be carried out.

FIG. 1 illustrates an example electronic environment 100 for carrying out the improved technique. Electronic environment 100 includes host 110, datacenter 120, network 130, and best practices server 150.

Host 110 is arranged to run multi-system management application 111. Host 110 is, in example environment 100, a desktop computer, although in some arrangements, host 110 may be any other kind of computing device, such as a server, a laptop computer, or the like.

Multi-system management application 111 is configured to assign configurations to each of the data storage systems 122(1), 122(2) . . . , 122(M) (data storage systems 122) of datacenter 120, including allocating storage to corresponding logical disks (LUNs) 124. Datacenter 120 is configured to store and provide access to data stored in data storage systems 122. Datacenter 120 further includes a data collection module 128 for collecting live runtime data 142 to be sent to multi-system management application 111.

Multi-system management application 111 is also configured to receive from data collection module 128 live runtime data 142 indicating runtime performance of the LUNs 124; in some arrangements, however, multi-system management application 111 is configured to analyze live runtime data 142, generated by data collection module 128. Multi-system management application 111 is further configured to perform a comparison between the live runtime data 142 and expected runtime data 152. Multi-system management application 111 is further configured to adjust the configuration state 126 of the multiple data storage systems 122 based on the comparison.

In some arrangements, multi-system management application 111 contains a management module 112 and a sizer module 114. Management module 112 is a software module within multi-system management application 111 and is arranged to generate reports 144 containing live runtime data 142 via a report generator module 113 and adjust configurations of LUNs 124 via an adjustor module 117.

Sizer module 114 is a software module within multi-system management application 111. Sizer module 114 is arranged to receive expected runtime data 152 from best practices server 150 and compare expected runtime data 152 to live runtime data 142 contained in reports 144. Sizer module 114 is also arranged to identify anomalies within live runtime data 142 and alert management module 112 about them.

Each data storage system, say, 122($m$) for 1≤$m$≤M, has a storage processor 127($m$). Data storage system 122($m$) has its data arranged in a set of LUNs 124($m$)(1), 124($m$)(2), . . . , 124($m$)(Nm) (generally LUNs 124($m$)), where Nm is the number of LUNs for data storage system 122($m$). Data storage system 122($m$) has a configuration state 126($m$) that indicates inter alia the amount of storage dedicated to each of LUNs 124($m$).

Network 130 provides network connections between host 110, datacenter 120, and best practices server 150. Network 130 may implement a variety of protocols such as TCP/IP, UDP, ATM, Ethernet, Fibre Channel, combinations thereof, and the like. Furthermore, network 130 may include various components (e.g., cables, switches/routers, gateways/bridges, NAS/SAN appliances/nodes, interfaces, etc.). Moreover, network 130 is capable of having a variety of topologies (e.g., queue manager-and-spoke, ring, backbone, multi drop, point to-point, irregular, combinations thereof, and so on).

Best practices server 150 provides runtime data from other data storage systems in other datacenters so that anomalous behavior in data storage systems 122 in datacenter 120 may be detected and acted upon by host 110. Best practices server 150 may contain runtime data generated from data storage systems that behave according to the best practices established by their vendors.

During operation, host 110, by execution of multi-system management application 111, provides an initial configuration to data storage systems 122. For example, host 110 composes RAID groups from those available in system 122 physical disks (SSD, SAS, NL-SAS), allocates on RAID groups a number of LUNs 124 and does this for each data storage system 122. The amount of storage allocated to each LUN 124 may be based on an anticipated usage profile for that LUN 124. For example, in a corporate environment, such an anticipated usage profile for a LUN 124 is derived from an assignment of that LUN 124 to a particular kind of workload or workgroup of users all having similar usage profiles. Specifically, one LUN 124 may be dedicated to an accounting database software, while another LUN 124 may be dedicated to an engineering group that uses shared directories for video files storage.

At some point, host 110 sends a command to data collection module 128 to generate live runtime data 142 from data storage systems 122. In some arrangements, however, host 110 collects such data on a continuous basis and is grabbing a snapshot of such data in time according to a predefined schedule. In other arrangements, data collection module 128 generates live runtime data 142 in response to an external request from, e.g., an administrator that has noticed something is not quite right with a particular data storage system 122($m$).

It should be understood that live runtime data 142 contains statistical data concerning access requests per unit time for each LUN 124 in data storage systems 122. For example, live runtime data 142 may contain data such as peak and average utilization, number of reads, and write size; and standard deviation of read and write cache hit ratio. Such live runtime data 142 provides a basis for understanding how each LUN 124 is behaving throughout datacenter 120.

Meanwhile, host 110 acquires expected runtime data 152 from best practice server 150. In some arrangements, such acquisition is performed by sizer module 114 of multi-system management application 111 running on host 110. In such a case, management module 112 provides live runtime data 142 to sizer module 114 in the form of reports 144 generated by report generator module 113.

It should be understood that report generator module 113 generates reports 144 in a standard format; best practices server 150 also sends expected runtime data 152 in such a format. An example of such a format is known as a NAR file (e.g., for a VNX system) that contains performance and other system-related data for various data storage systems 122. Upon receiving live runtime data 142 and the most current expected runtime data 152, host 110 compares live runtime data 142 for each data storage system 122 to analogous expected runtime data 152. In some arrangements, such a comparison is made by comparator module 115 within sizer module 114. In this case, comparator module 115 accesses reports 144 and performs differencing operations using expected runtime data 152 to find anomalous behavior in the statistics in live runtime data 142. For example, by comparing peak utilizations in live runtime data 142 for a particular data storage system 122(m) to those in expected runtime data 152, comparator module 115 may uncover the fact that, for LUN 124(m)(n) in particular data storage system 122(m), peak reads have been significantly exceeding expectations for a LUN 124 of that size.

Upon detection of an anomaly in live runtime data 142, host 110 prepares to adjust the configuration of certain data storage systems 122 in order to correct the anomaly. In some arrangements, sizer module 114 issues an alert to management module 112. Upon receiving the alert, adjustor module 117 in management module 112 determines the adjustment 160 that would correct the anomaly without disrupting operation of datacenter 120.

It should be understood that such an adjustment 160 may involve interactions between data storage systems 122 of datacenter 120. For example, storage from a LUN 124(m1)(n1) in one data storage system 122(m1) may be allocated to another LUN 124(m2)(n2) in another data storage system 122(m2). Such an automated reconfiguration of datacenter 120 is without precedent; rather, only a configuration of a single data storage system without reference to any others in a datacenter was possible. Further details of such an autoconfiguration of datacenter 120 will be discussed in detail below in connection with FIGS. 2 and 3.

Figure 2:
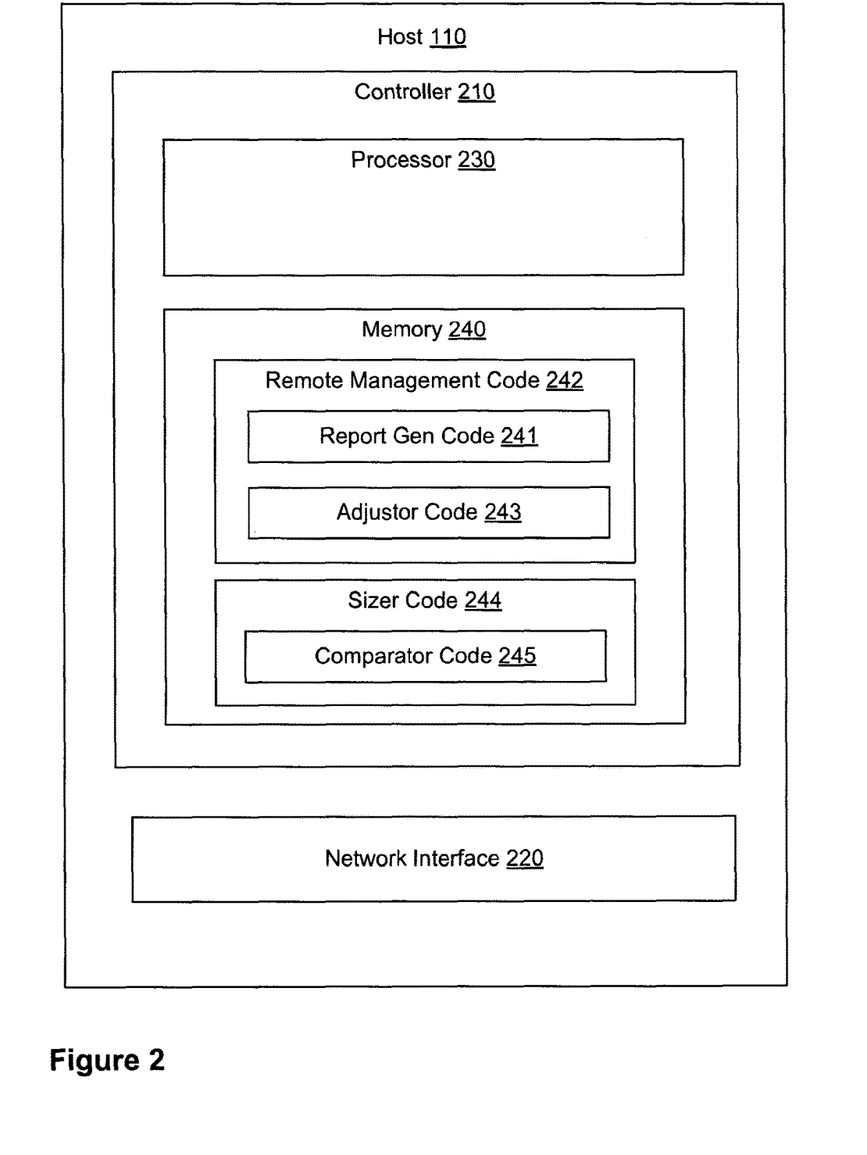
FIG. 2 is a block diagram illustrating an example host system within the electronic environment shown in FIG. 1 for use in carrying out the improved techniques.

FIG. 2 illustrates details of host 110. Host 110 includes controller 210, which in turn includes processor 230 and memory 240. Host 110 also includes network interface circuitry 220.

Network interface circuitry 20 is configured to access a computer network. Network interface circuitry 220 may take the form of an Ethernet card; in some arrangements, network interface circuitry 220 may take other forms including that of a wireless receiver or a token ring card, for example.

Memory 240 is configured to store code from various applications running on host 110. For example, memory 240 may contain code 242 from management module 112 and code 244 from sizer module 114. In some arrangements, code 242 from management module 112 includes code 241 from report generator module 113 and adjustor code 243 from adjustor module 117. Code 244 from sizer module 114 includes code 246 from comparator module 115. Memory 46 generally takes the form of, e.g., random access memory, although in some arrangements memory 46 may include flash memory or a non-volatile memory.

Processor 230 may take the form of, but is not limited to, Intel or AMD-based CPUs, and can include a single or multiple cores each running single or multiple threads. Processor 230 is coupled to memory 240 and is configured to execute instructions from code 242 and 244.

Figure 3:
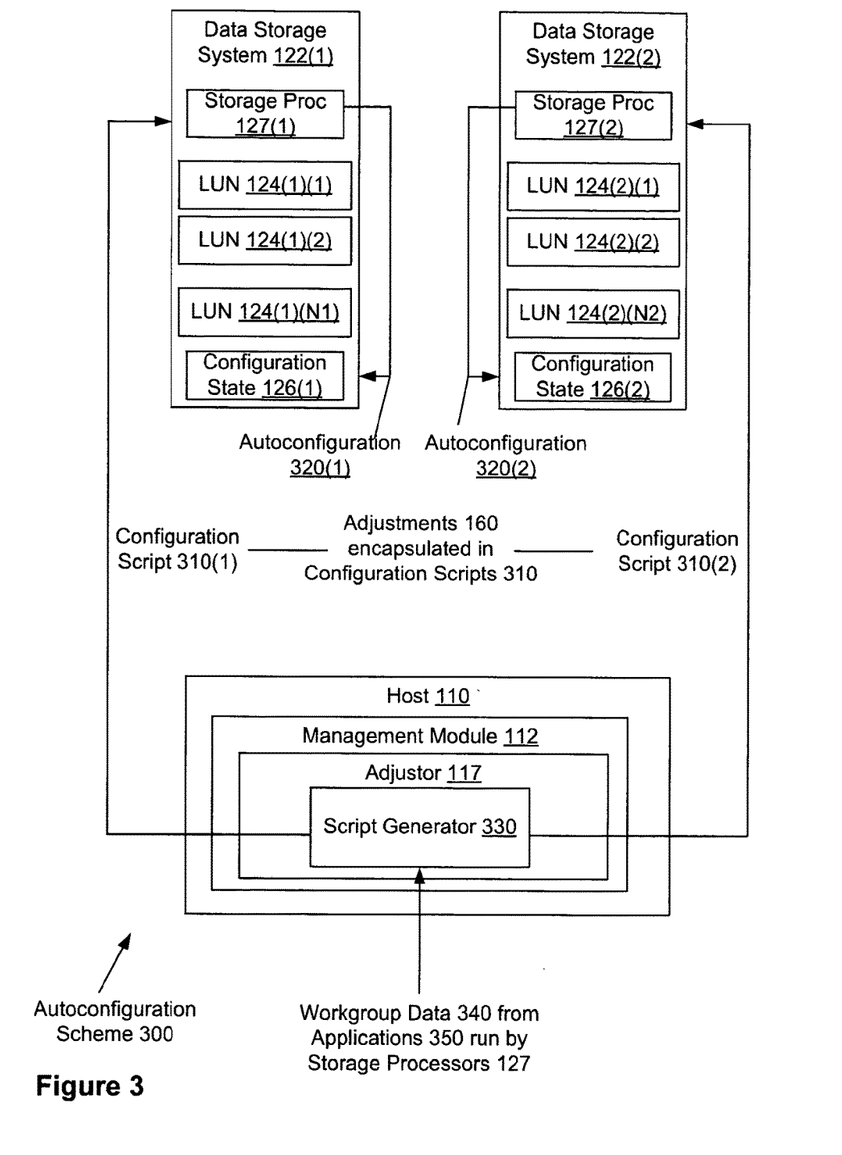
FIG. 3 is a block diagram illustrating an example autoconfiguration process within the electronic environment shown in FIG. 1.

FIG. 3 illustrates an example autoconfiguration scheme 300 for datacenter 120. In this case, adjustor module 117 includes a script generation module 330, which is arranged to automatically generate configuration scripts 310(1) and 310(2) in response to receiving comparison results from comparator module 115.

Configuration scripts 310(1) and 310(2) are each configured to provide instructions to respective storage processors 127(1) and 127(2) to configure LUNs on their respective data storage systems 122(1) and 122(2). Each such configuration script 310(1) and 310(2) may be written in a scripting language that is recognized by respective storage processors 127(1) and 127(2), e.g., Javascript, Perl, C shell, or the like.

It should be understood that the two scripts 310(1) and 310(2) shown in FIG. 3 are only an example, and any number of scripts 310 may be used in autoconfiguration scheme 300.

During operation, script generation module 330 receives adjustor input 160 from adjustor module 117. In response, script generation module 330 takes adjustor input 160 and uses it to fill in details into a script template. Script generation module 330 may generate scripts 310 for all data storage systems 122 for which adjustments are made via adjustor input 160. Once the scripts 310 are generated, then host 110 sends these scripts 310 to the respective data storage systems 122.

Once scripts 310 are received, respective storage processor 127 runs configuration script 310 as part of autoconfiguration step 320, i.e., autoconfiguration 320(1) and autoconfiguration 320(2). Upon running each respective autoconfiguration step 320, respective storage processor 127 configures its own LUNs 124 in data storage system 122 to reflect live runtime data 142.

One example of a reconfiguration of datacenter 120 occurs with respect to the workgroups discussed above. For example, one workgroup may be accountants that access a database using a database application. Normally, this workgroup uses storage allocated within a LUN 124 in a data storage system 122 to carry out their operations. Nevertheless, suppose that a merger is about to occur in the company for which they work, and they are tasked with generating a massive amount of financial information. In this case, there will be acute anomalies in how they use their LUN 124. Host 110 will spot this difference and generate a script to be run on a respective storage processor, as well as another storage processor from which storage will be claimed, for reconfiguration. No human administrators need have been involved in any step here.

Figure 4:
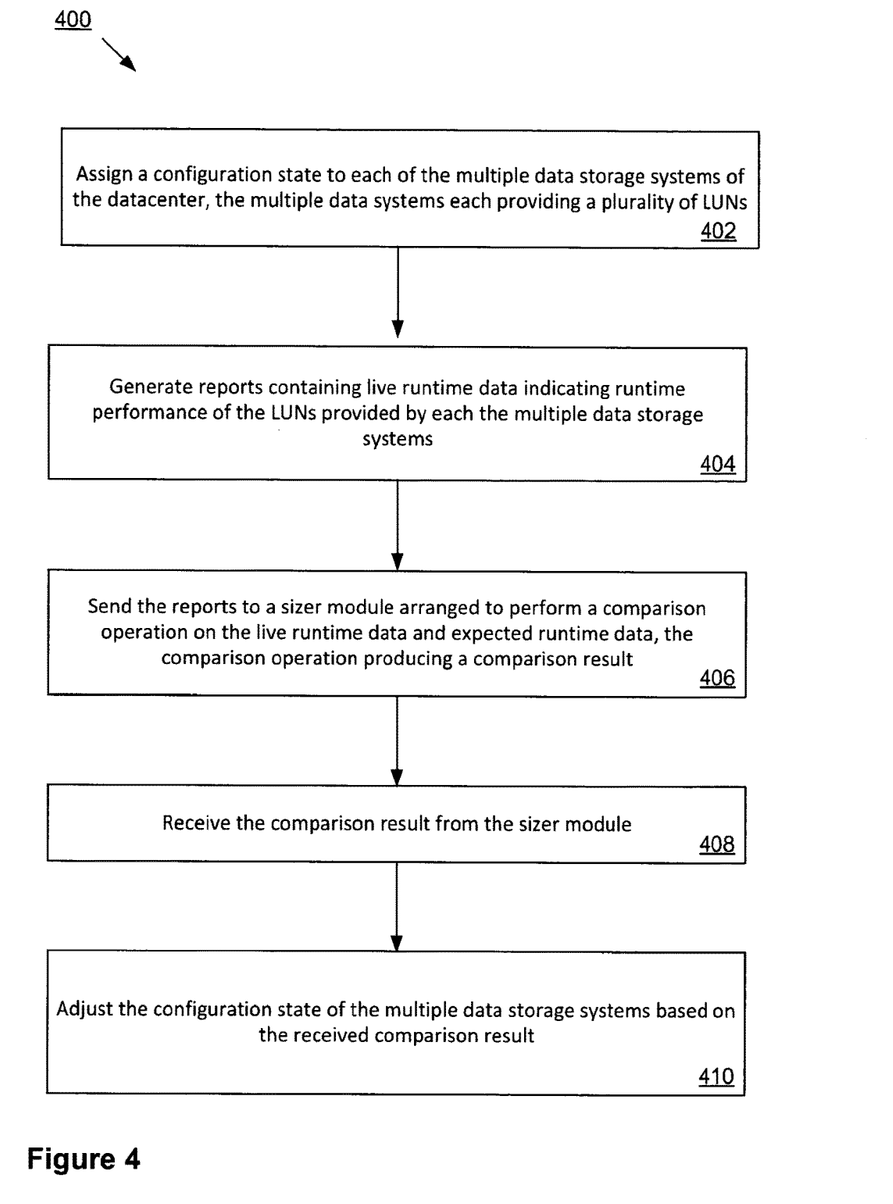
FIG. 4 is a flow chart illustrating an example method of carrying out the improved technique within the electronic environment shown in FIG. 1.

FIG. 4 illustrates a method 400 of operating a datacenter, e.g., datacenter 120, having multiple data storage systems, e.g., datacenters 122(1), 122(20, . . . , 122(M).

In step 402, host 110 assigns a configuration state 126 to each of the multiple data storage systems 122 of the datacenter 120, the multiple data storage systems 122 each providing a plurality of logical disks 124.

In step 404, host 110 generates live runtime data 144 indicating runtime performance of the logical disks 124 provided by each of the multiple data storage systems 122.

In step 406, host 110 performs a comparison operation on the live runtime data 142 and expected runtime data 152, the comparison operation producing a comparison result.

In step 408, host 110 adjusts the configuration state of the multiple data storage systems 122 based on the comparison result.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to host server 110, which is constructed and arranged to operate a datacenter having multiple data storage systems. Some embodiments are directed to a process of operating a datacenter having multiple data storage systems. Also, some embodiments are directed to a computer program product that enables computer logic to cause a computer to operate a datacenter having multiple data storage systems.

In some arrangements, host 110 is implemented by a set of cores or other types of control/processing circuitry running software. In such arrangements, the software instructions can be delivered, within host 110, either in the form of a computer program product, or simply instructions on disk or in pre-loaded in memory 240 of host 110, each computer program product having a computer readable storage medium which stores the instructions in a non-volatile manner. Alternative examples of suitable computer readable storage media include non-transitory, tangible articles of manufacture and apparatus such as CD-ROM, flash memory, disk memory, tape memory, and the like.

What is claimed is:

1. A method of operating a datacenter having multiple data storage systems, the multiple data storage systems each providing a plurality of logical disks, the method comprising:
   assigning, for each of the multiple data storage systems of the datacenter, an initial amount of storage to each logical disk provided by that data storage system based on an anticipated usage profile for that logical disk;
   analyzing live runtime data indicating runtime performance of the logical disks provided by each of the multiple data storage systems;
   performing a comparison operation on the live runtime data and expected runtime data, the comparison operation producing a comparison result; and
   reallocating storage from one logical disk to another logical disk based on the comparison result, wherein:
      the one logical disk is provided by a first data storage system of the multiple data storage systems;
      the other logical disk is provided by a second data storage system of the multiple data storage systems, the second data storage system being distinct from the first data storage system; and
      reallocating storage from one logical disk to the other logical disk based on the comparison result includes reallocating storage from the one logical disk on the first data storage system to become part of the other logical disk, the other logical disk then spanning both the first data storage system and the second data storage system.

2. The method of claim 1, wherein analyzing the live runtime data includes accessing and analyzing the live runtime data according to a specified schedule.

3. The method of claim 1, wherein analyzing the live runtime data includes accessing and analyzing the live runtime data in response to an automated external request.

4. The method of claim 1, wherein the comparison result includes a difference between a runtime statistic and an expected value of that statistic; and
   wherein reallocating storage from one logical disk to the other logical disk includes selectively reallocating the storage based on the difference.

5. The method of claim 4, wherein the comparison operation is also performed on best practices statistical data, the best practices statistical data containing runtime data from data storage systems of other datacenters, the best practices statistical data being stored in a central server; and
   wherein the method further comprises sending reports containing the live runtime data indicating runtime performance of the logical disks provided by each of the multiple data storage systems to the central server.

6. The method of claim 1, wherein assigning the initial amount of storage includes assigning the initial amount of storage to each logical disk for each of the multiple data storage systems of the datacenter based on best practices statistical data, the best practices statistical data containing runtime data from data storage systems of other datacenters.

7. The method of claim 1, wherein the method further comprises generating the live runtime data by specifying a profile of a workload or workgroup for analysis, the workgroup containing a set of users having similar usage patterns; and
   wherein reallocating storage from one logical disk to the other logical disk includes selectively changing the amounts of storage respectively assigned to the one logical disk and the other logical disk based on the runtime behavior of logical disks provisioned for that workgroup or workload.

8. The method of claim 7, wherein the method further comprises generating the live runtime data by obtaining logical disk access data from each of a set of applications utilizing data storage of the multiple data storage systems; and
   wherein specifying the profile of the workload or workgroup for analysis includes identifying particular properties of the set of applications.

9. The method of claim 1, wherein performing the comparison operation on the live runtime data and expected runtime data includes:
   producing reports containing the live runtime data;
   sending the reports to a sizer module arranged to (i) receive the expected runtime data, and (ii) perform the comparison operation on the live runtime data and expected runtime data; and
   receiving the comparison result from the sizer module.

10. The method of claim 1 wherein each data storage array contains multiple storage devices.

11. The method of claim 10 wherein:
    the one logical disk initially includes storage distributed across a first plurality of the multiple storage devices of the first data storage system;
    the other logical disk initially includes storage distributed across a second plurality of the multiple storage devices of the second data storage system; and
    reallocating storage from the one logical disk on the first data storage system to become part of the other logical disk includes reallocating storage from the first plurality of the multiple storage devices of the first data storage system to no longer be allocated to the one logical disk but to instead become allocated to the other logical disk, wherein, upon reallocating the storage, the other logical disk includes storage distributed across both the first plurality of the multiple storage devices of the first data storage system and the second plurality of the multiple storage devices of the second data storage system.

12. A computer program product comprising a non-transitory, computer-readable storage medium which stores executable code, which when executed by a computing device configured to operate a datacenter having multiple data storage systems, the multiple data storage systems each providing a plurality of logical disks, causes the computing device to:
    assign, for each of the multiple data storage systems of the datacenter, an initial amount of storage to each logical disk provided by that data storage system based on an anticipated usage profile for that logical disk;

analyze reports containing live runtime data indicating runtime performance of the logical disks provided by each the multiple data storage systems;

perform a comparison operation on the live runtime data and expected runtime data, the comparison operation producing a comparison result; and reallocate storage from one logical disk to another logical disk based on the comparison result, wherein:

the one logical disk is provided by a first data storage system of the multiple data storage systems;

the other logical disk is provided by a second data storage system of the multiple data storage systems, the second data storage system being distinct from the first data storage system; and reallocating storage from one logical disk to the other logical disk based on the comparison result includes reallocating storage from the one logical disk on the first data storage system to become part of the other logical disk, the other logical disk then spanning both the first data storage system and the second data storage system.

13. The computer program product of claim 12, wherein analyzing the reports containing live runtime data includes accessing and analyzing the live runtime data according to a specified schedule.

14. The computer program product of claim 12, wherein analyzing the reports containing live runtime data includes accessing and analyzing the live runtime data in response to an automated external request.

15. The computer program product of claim 12, wherein the comparison result includes a difference between a runtime statistic and an expected value of that statistic; and wherein reallocating storage from one logical disk to the other logical disk includes selectively changing the configuration state based on the difference.

16. The computer program product of claim 15, wherein the comparison operation is also performed on best practices statistical data, the best practices statistical data containing runtime data from data storage systems of other datacenters, the best practices statistical data being stored in a central server; and wherein the computing device is further caused to send reports containing the live runtime data indicating runtime performance of the logical disks provided by each of the multiple data storage systems to the central server.

17. The computer program product of claim 12, wherein assigning the initial amount of storage includes assigning the initial amount of storage to each logical disk for each of the multiple data storage systems of the datacenter based on best practices statistical data, the best practices statistical data containing runtime data from data storage systems of other datacenters.

18. The computer program product of claim 12, wherein the executable code, when executed by the computing device further causes the computing device to generate the live runtime data by specifying a profile of a workload or workgroup for analysis, the workgroup containing a set of users having similar usage patterns; and wherein adjusting the configuration state of the multiple data storage systems includes selectively changing the configuration state based on the runtime behavior of logical disks provisioned for that workgroup or workload.

19. The computer program product of claim 18, wherein the executable code, when executed by the computing device further causes the computing device to generate the live runtime data by obtaining logical disk access data from each of a set of applications utilizing data storage systems of the multiple data storage systems; and wherein specifying the profile of the workload or workgroup for analysis includes identifying particular properties of the set of applications.

20. A system constructed and arranged to operate a datacenter, the system comprising:

a plurality of data storage arrays, each data storage array containing multiple storage devices, each of the plurality of data storage arrays providing a plurality of logical disks;

a network; and a host configured to run a datacenter management application arranged to operate the datacenter, the host including a network interface, memory, and a controller including controlling circuitry constructed and arranged to:

assign, for each of the plurality of data storage systems of the datacenter, an initial amount of storage to each logical disk provided by that data storage system based on an anticipated usage profile for that logical disk;

analyze live runtime data indicating runtime performance of the logical disks provided by each of the multiple data storage systems;

perform a comparison operation on the live runtime data and expected runtime data, the comparison operation producing a comparison result; and reallocating storage from one logical disk to another logical disk based on the comparison result, wherein:

the one logical disk is provided by a first data storage array of the multiple data storage systems;

the other logical disk is provided by a second data storage array of the plurality of data storage arrays, the second data storage array being distinct from the first data storage array; and reallocating storage from one logical disk to the other logical disk based on the comparison result includes reallocating storage from the one logical disk on the first data storage array to become part of the other logical disk, the other logical disk then spanning both the first data storage array and the second data storage array.

* * * * *